May 31, 1927.
E. C. POMEROY
SIGNAL
Filed July 7, 1924
1,630,802
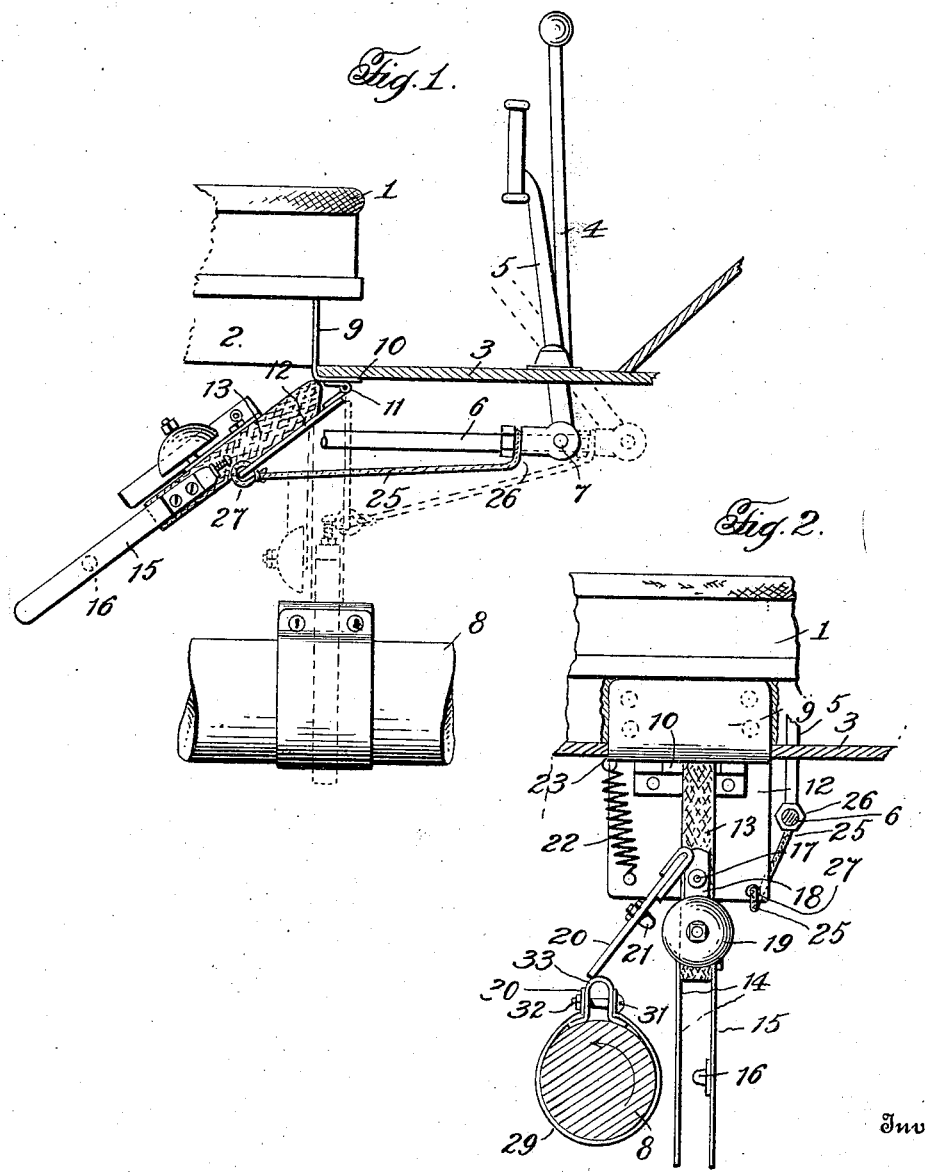
Witness:
Jas E Hutchinson
Inventor:
Edwin C. Pomeroy,
By Milans & Milans
Attorneys Patented May 31, 1927.

1,630,802

UNITED STATES PATENT OFFICE.

EDWIN C. POMEROY, OF NEW MILFORD, CONNECTICUT.

SIGNAL.

Application filed July 7, 1924. Serial No. 724,618.

My invention relates to new and useful improvements in signals and more particularly to a signal for giving warning to the operator of a motor vehicle should he endeavor to operate the vehicle without releasing what is commonly known as the emergency brake.

The primary object of the invention resides in providing a member which is operable by the emergency brake operating mechanism to be positioned, when the emergency brake is on, to be engaged by a member carried by the drive shaft, when the engine is started, or the vehicle is put in motion, the contact of the drive shaft member with the member operable by the emergency brake operating mechanism, operating a visible or audible signal to give warning to the vehicle operator that he should release the emergency brake.

A further object of the invention consists in connecting a pivoted member or arm to a stationary part of the vehicle and flexibly connecting said member or arm to the emergency brake operating mechanism, the member or arm, when the emergency brake is released, being positioned out of the path of the member carried by the drive shaft but when the emergency brake is set or on to be swung into the path of the member carried by the drive shaft and adapted to be engaged thereby to cause the operation, as has been previously set forth, of either a visible or audible signal or both.

Still another object resides in the provision of means for normally holding the member or arm connected to the stationary part of the vehicle in raised or inoperative position, means also being provided to prevent rattling of said member or arm to cause noises which would be objectionable in the operation of a motor vehicle.

For a further object I form the member which is connected to the drive shaft in such a manner that it may be adjusted to shafts of different diameters and be securely connected thereto against longitudinal or rotatable movement relative thereto, said member being provided with a projection which is adapted to engage the operating mechanism of the member or arm which is connected to the stationary part of the vehicle and operated by the emergency brake operating mechanism.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a side elevation with parts shown in section, and

Fig. 2 is an end view with the drive shaft and brake operating rod shown in transverse section, this view looking in the direction towards the right of Fig. 1.

It is a well known fact that operators of motor vehicles, particularly new drivers, will at times endeavor to set the vehicle in motion without releasing the emergency brake which has been set at the time that the vehicle has been stopped and the only way in which the fact is drawn to the operator's attention is by the uneven movement of the vehicle or the burning of the brake linings. This often results in considerable expense to the owner in having the brakes re-lined and it is for this reason that I have provided my improved form of signal which will give warning to the operator that the emergency brake is on when he starts the engine, or puts the vehicle in motion, without releasing the brakes. My signal may operate a light placed upon the instrument board or operate a bell or other suitable signal either operating one or the other of these or both if so desired.

In the drawings 1 indicates the front seat of a motor vehicle which is shown as supported upon the board or beam 2, 3 indicates the usual floor board, 4 the gear shift lever, 5 the emergency brake operating lever, 6 the rod pivoted to the lower end of the brake operating lever at 7, and secured at its opposite end to the emergency brake setting mechanism, and 8 indicates the usual drive shaft which as usual is rotated in the direction indicated by the arrow in Fig. 2 of the drawings.

Secured to the forward edge of the seat supporting member 2, by screws or other suitable fastenings, is a plate 9 having the right angle projection 10 which extends beneath the floor board 3 as more particularly illustrated in Fig. 1 of the drawings. Hingedly connected at 11 to the extension 10 is a plate 12 to which is secured the strip of insulating material 13, preferably of rubber or other similar material the end of which will engage the lower end of the plate 9 when the plate 12, with its associated mechanism, is swung into the position illustrated in Fig. 1 of the drawings to provide a buffer and prevent rattling. Secured to this insulating strip by means of bolts or other suitable fastening are the contact plates 14 and 15, which are normally spaced apart as more particularly illustrated in Fig. 2 of the drawings, the plate 15 carrying an inwardly extending projection 16 which is adapted to be engaged by the plate 14 when the contact plate 14 is operated in a manner to be later described. The contact plates 14 and 15 are of such a length as to extend to the side of the drive shaft 8, when the plate 12 is in lowered or vertical position, as more particularly illustrated by dotted lines in Fig. 1 and in full lines in Fig. 2.

Also secured to the insulating strip 13, by bolts 17 or other suitable fastening, is a plate 18 to which is connected a bell 19. Also connected to the plate 18 is a spring clapper arm 20 which has the point or projection 21 which is adapted to engage the bell 19 and cause the ringing thereof. This spring clapper arm 20 is of such a length as to be engaged by the member, to be later described, which is connected to the drive shaft 8. The plate 12 is normally held in its raised or inclined position, shown in Fig. 1, by means of the coiled spring 22, one end of which is connected at 23 to the plate 9 and the other end connected at 24 to the plate 12. A flexible cable 25 is connected at 26 to the brake rod 6 and at 27 to the plate 12, this flexible connection allowing adjustment of the brake rod or brake without affecting the operation of the signal mechanism.

Secured to the drive shaft 8 is a band 29, said band having the flanges 30 through which the bolt 31 is adapted to pass and be secured in position by the nut 32. Clamped between the flanges 30 is the inverted U-shaped member 33 which is rounded at the top as quite clearly shown in Fig. 2 and at its lower ends is provided with the outwardly extending flanges which engage between the shaft and band 29. By having this member of inverted U-shape the same may be sprung sufficiently to allow the band 29 to be tightly drawn around the shaft 8 and securely connect it thereto against longitudinal or rotatable movement relative thereto. It will be seen that as the shaft 8 rotates the member 33 forms a projection which will engage the contact arm 14 as well as the spring clapper arm 20.

From the above detail description it is thought that the operation will be clearly understood but it might be stated that when the emergency brake is off that the coiled spring 22 will hold the plate 12 in its raised or inclined position as more clearly illustrated in Fig. 1 of the drawings and the drive shaft 8 may rotate without operating the signal. When the emergency brake is on the lever 5 and the rod 6 are thrown into the position indicated in dotted line in Fig. 1 and through the flexible connection 25 the plate 12 will be lowered, with its associated parts into the position indicated in dotted lines in Fig. 1 and the contact arm 14 and the spring clapper arm 20 will be within the path of the projection 33 which is carried by the shaft 8. Should the engine be started, or the vehicle set in operation, without releasing the emergency brake, of course, the shaft 8 will rotate and the member 33 engaging the contact arm 14 will move the same into engagement with the projection 16 of the arm 15 and thereby complete a circuit to operate a light or other visible or audible signal placed on the instrument board of the vehicle or in other suitable position to be seen or heard by the operator. A further rotation of the shaft will engage the projection 33 with the end of the spring clapper arm 20, as shown in Fig. 2, and draw the projection 21 away from the bell 19 and then when the projection passes from engagement with the clapper arm it will spring back so that the projection 21 will engage the bell and ring the same. The operator of the vehicle will then have immediate notice that the emergency brake is on and can release the same before doing damage to the brake linings. While I have illustrated both means for operating a visible and audible signal, it will be understood that if desired only one of these might be used without departing from the spirit of the invention.

I place particular advantage in having the hinged or pivoted member connected to a stationary part of the vehicle and then flexibly connecting the same to the brake operating mechanism. By doing this the brake mechanism may be adjusted without in any way affecting the operation of the signal and the parts are so held that there will be no rattling to cause noises which would be objectionable. The insulating strip 13 being of rubber or similar material forms a buffer when the plate 12 is raised and held in such raised position by means of the coiled spring 22.

It will also be noted that my improved form of signal is of such a construction that it may be easily connected to the vehicle without in any way affecting the operating mechanism of the vehicle. In other words the signal may be connected to those cars which are at present in use as well as upon new cars.

Having fully described my invention what I claim as new and desire to secure by Letters Patent is:

1. A signal of the character described for motor vehicles comprising a member adapted to be connected to the drive shaft of the vehicle, a member connected to the vehicle for swinging movement, an alarm carried by the swinging member, means carried by the swinging member and adapted to be engaged by the member carried by the drive shaft for operating the alarm, means connecting the swinging member with the emergency brake operating mechanism of the vehicle whereby when the emergency brake is on the swinging member will be so positioned that the alarm operating mechanism carried thereby will be engaged by the member connected to the drive shaft, and means for returning the swinging member to inoperative position when the emergency brake is released.

2. A signal of the character described for motor vehicles comprising a member adapted to be connected to the drive shaft of the vehicle, a member connected to the vehicle for swinging movement, an alarm means connecting the swinging member with the emergency brake operating mechanism of the vehicle for positioning said swinging member in the path of the member carried by the drive shaft when the emergency brake is on, means carried by the swinging member and adapted to be engaged by the member connected to the drive shaft for operating the alarm, and means for returning the swinging member to inoperative position when the emergency brake is released.

In testimony whereof I hereunto affix my signature.

EDWIN C. POMEROY.